Oct. 16, 1951     A. E. DENTLER     2,571,220
FRICTION SHOCK ABSORBING MECHANISMS
Filed Dec. 19, 1945     2 Sheets-Sheet 2
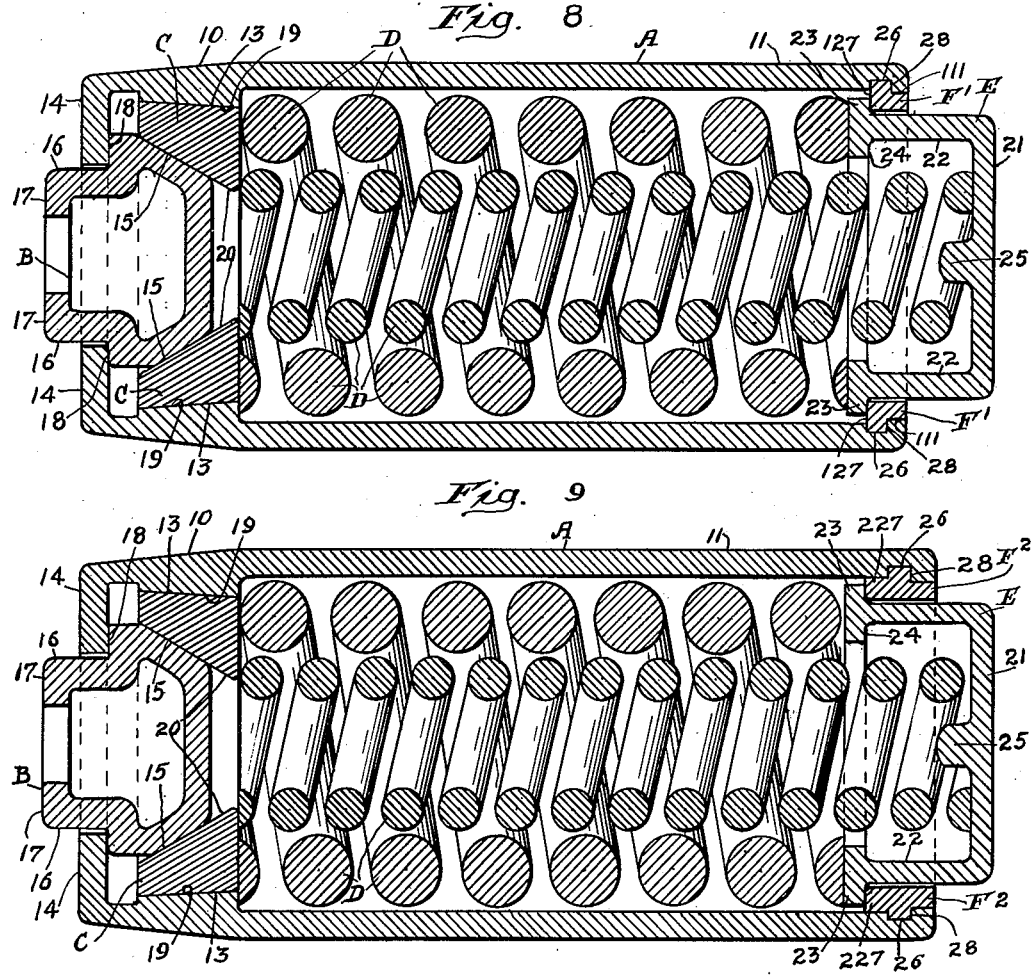
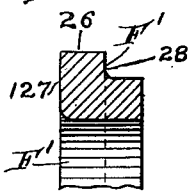
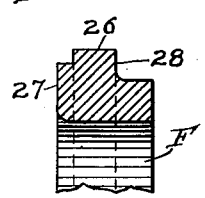
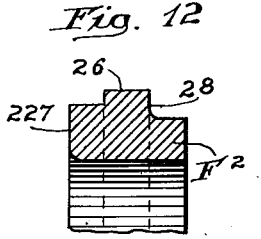
Inventor:
Arnold E. Dentler.
By Henry Fuchs.
Atty.

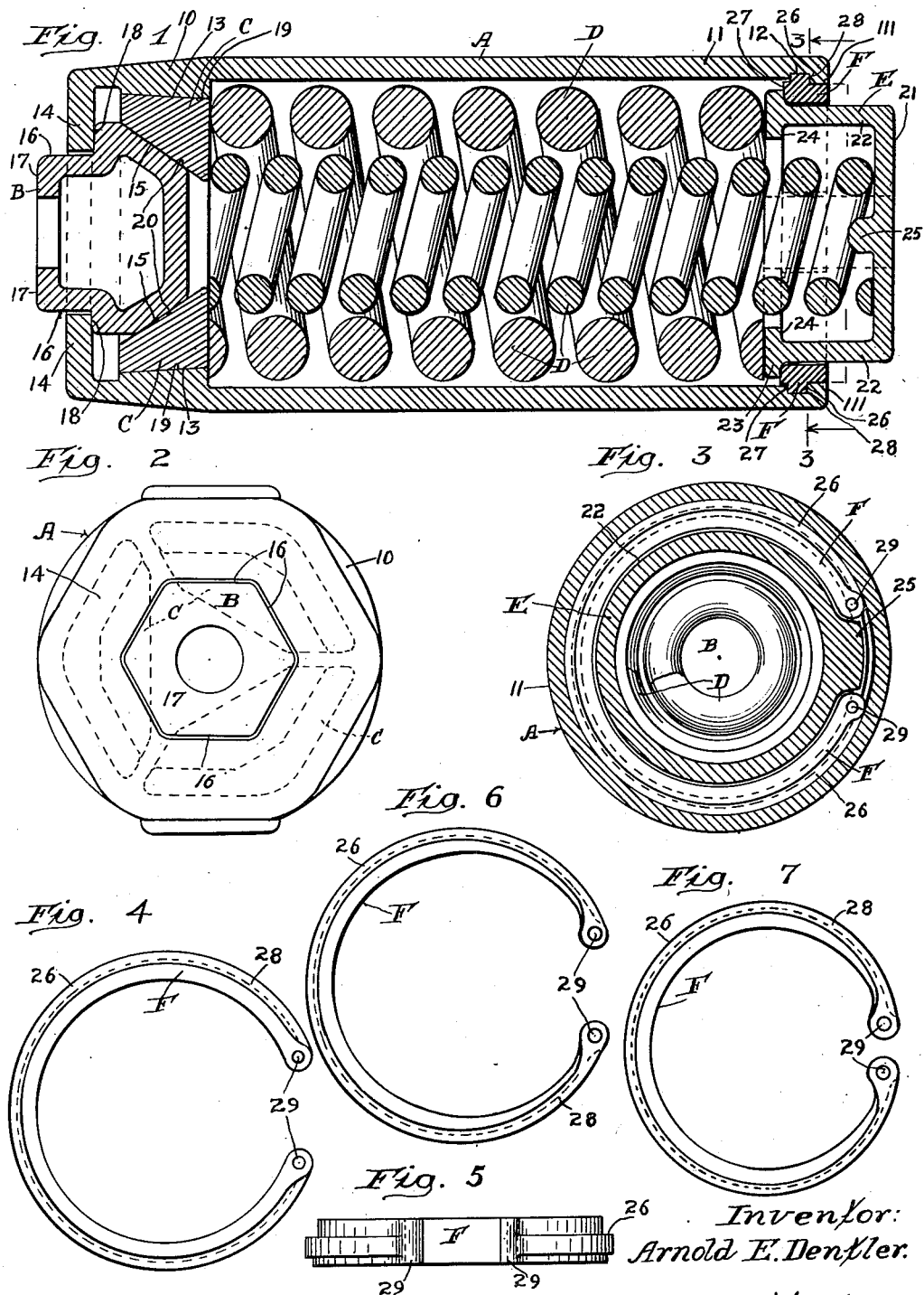

UNITED STATES PATENT OFFICE 2,571,220

FRICTION SHOCK ABSORBING MECHANISMS

Arnold E. Dentler, La Grange, Ill., assignor to W. H. Miner, Inc., Chicago, Ill., a corporation of Delaware Application December 19, 1945, Serial No. 635,899

1 Claim. (Cl. 213—32)

This invention relates to improvements in friction shock absorbing mechanisms and the method of production of the same.

One object of the invention is to provide a friction shock absorbing mechanism comprising a friction casing having a friction shell section at one end thereof and a spring cage section rearwardly of the friction shell; a friction clutch within the friction shell section including a wedge and friction shoes, the wedge having shouldered engagement with the casing to limit outward movement of the wedge and hold the same assembled with the casing; a spring resistance within the spring cage section of the casing; a preliminary spring cap slidingly telescoped within the spring cage end of the casing and cooperating with the spring resistance; and an expandible split retaining and spacing element having shouldered engagement with the spring cap and casing respectively to limit outward movement of the spring cap.

A further object of the invention is to provide a friction shock absorbing mechanism, as set forth in the preceding paragraph, wherein the friction clutch, spring resistance, and spring cap are assembled with the friction casing by entering the same through the outer end of the spring cage section of the casing, which is open, and wherein the assembled parts are retained by the expandible retaining and spacing element, which is in the form of a split spring ring having shouldered engagement with the casing and spring cap.

A still further object of the invention is to provide a friction shock absorbing mechanism having preliminary spring action and including a friction casing, a sliding friction clutch within the casing at one end thereof, a preliminary spring cap slidingly telescoped within the other end of the casing, and a spring resistance reacting between the clutch and the spring cap yieldingly opposing movement thereof inwardly of the casing, wherein the spring cap is held assembled with the casing and has its movement outwardly of the casing limited by simple and efficient retaining and spacing means which may be readily applied and is also readily removable to facilitate assembling and disassembling of the mechanism.

Yet another object of the invention is to provide a method of manufacture of friction shock absorbing mechanisms of the character hereinbefore set forth, whereby production of such mechanisms of substantially uniform overall length is attained regardless of unavoidable inaccuracies in dimensions of some or several of the parts thereof, due to tolerance limits permissible in foundry practice, the variations in overall length of such mechanisms, which would otherwise occur due to such inaccuracies, being taken care of by initially providing a plurality of combined retaining and spacing elements varying in spacing qualities, each having a pair of shoulders spaced lengthwise of the mechanism and engageable with the spring cap and a stop shoulder on the casing respectively to restrict outward movement of the cap, and assembling the parts of the mechanism employing the particular combined retaining and ring required to hold the mechanism adjusted to the proper overall length.

Other objects of the invention will more clearly appear from the description and claims hereinafter following.

In the drawings forming a part of this specification, Figure 1 is a longitudinal, vertical sectional view of a friction shock absorbing mechanism embodying my invention. Figure 2 is a front elevational view of Figure 1. Figure 3 is a transverse, vertical sectional view, corresponding substantially to the offset line 3—3 of Figure 1. Figure 4 is a plan view of the combined spacing and retaining ring of my improved mechanism looking from right to left in Figure 1. Figure 5 is an elevational view, looking from right to left in Figure 4. Figure 6 is a view, similar to Figure 4, illustrating another form of retaining ring. Figure 7 is a view, similar to Figure 6, showing the ring contracted. Figure 8 is view, similar to Figure 1, showing a casing which is slightly shorter than the casing shown in Figure 1 and a combined spacing and retaining element similar to, but of lesser thickness than, the retaining element in Figure 1, to compensate for the decreased length of the friction casing. Figure 9 is a view, similar to Figure 1, showing a casing which is of slightly greater length than the casing shown in Figure 1 and a combined spacing and retaining element similar to, but of greater thickness than, the retaining element of Figure 1, to complensate for the greater length of the friction casing. Figures 10, 11, and 12 are radial sectional views, partly broken away, through the combined retaining and spacing rings shown in Figures 1, 8, and 9, respectively, said views being on an enlarged scale.

Referring first to the embodiment of the invention illustrated in Figures 1 to 5 inclusive and Figures 8 to 12 inclusive, the friction shock absorbing mechanism shown is of that type adapted for draft riggings of railway cars and more particularly for railway passenger cars.

My improved shock absorbing mechanism, as shown in Figures 1 to 5 inclusive and Figures 8 to 12 inclusive, comprises broadly a casing A; a wedge block B; three friction shoes C—C—C; a spring resistance D; a preliminary spring cap E; and a combined retaining and spacing ring or sleeve F.

The casing A is in the form of a tubular casting having a friction shell section 10 at the forward end and a spring cage section 11 rearwardly thereof. The spring cage section 11 is preferably of cylindrical cross section and has an inturned, annular flange 111 at the open rear end thereof. An annular retaining groove 12 is provided interiorly of the casing A, immediately adjacent the flange 111, said flange forming the rear wall of said groove. As will be clearly seen upon reference to Figures 1, 8, and 9, the flange 111 extends laterally inwardly slightly beyond the inner surface of the side wall of the casing A. The friction shell section of the casing is of hexagonal, transverse cross section, presenting six inwardly converging friction surfaces 13. As shown in Figures 1, 8, and 9, the walls of the shell are thickened at the friction surfaces 13 and said friction surfaces are spaced inwardly from the front end of the casing. At the forward end thereof, the friction shell section of the casing is provided with a continuous, inturned stop flange 14.

The wedge B is in the form of a hollow block having three inwardly converging, flat wedge faces 15 at the inner end thereof, arranged symmetrically about the longitudinal central axis of the mechanism. At the outer end, the wedge is reduced in size, said reduced portion being in the form of a hexagonal projection 16 extending through the opening defined by the flange 14 of the casing. The projection 16 protrudes from the casing, as shown in Figures 1, 8, and 9, and has a flat, transverse, outer end face 17 adapted to receive the actuating force. The reduced portion of the wedge B provides lateral shoulders 18 at the inner end of the projection adapted to engage in back of the flange 14 of the casing to limit outward movement of the wedge.

The shoes C, which are three in number, are arranged between the wedge faces of the block B and the friction surfaces of the casing. Each shoe has an outer friction surface 19 of V-shaped, transverse cross section, cooperating with two adjacent friction surfaces 13—13 of friction shell section 10 of the casing. Each shoe has a wedge face 20, correspondingly inclined to and engaging one of the wedge faces 15 of the wedge.

The spring cap E is of cup-shaped form having a transverse end wall 21 and a cylindrical side wall 22. At the inner end of the cap, an exterior, annular flange 23 is provided which projects laterally from the cylindrical wall 22. An inturned, annular flange 24, in alignment with the flange 23, together with the latter, forms an abutment for the outer coil of the spring resistance D. At one side thereof, the cap E presents a relatively wide rib 25 exending lengthwise thereof and projecting from the side wall 22. This rib extends from the flange 23 to the outer end of the cap and has its outer side face flush with the outer edge of said flange. As shown in Figures 1, 8, and 9, the diameter of the flange 23 is appreciably less than the internal diameter of the spring cage section of the casing and the diameter of the opening defined by the flange 111 of the casing. As will be evident, the cap may thus be freely entered through the opening at the rear end of the casing. Inasmuch as the annular flange 23 projects laterally from the wall 22 of the cap E, considerably greater clearance is provided between the wall 22 and the interior side wall of the casing A than between the flange 23 and said wall.

The combined retaining and spacing element F shown in Figure 1 is in the form of a radially split ring or sleeve having its ends at the split section thereof appreciably separated, as shown more clearly in Figures 3 and 4. Between its inner and outer ends, the ring or sleeve F is provided with a laterally projecting, peripheral flange or rib 26 adapted to extend into and seat within the annular groove 12 of the casing A to lock the ring against displacement both inwardly and outwardly of the casing. The opening provided between the opposed end portions of the split ring F is such that the rib 25 of the cap is embraced between said end portions and thus holds the ring against being contracted. The outer end face of the ring F is flush with the rear end of the casing A and the inner end face of said ring is offset slightly inwardly from the rib 26 thereof and forms a stop shoulder 27 against which the flange 23 of the cap E seats. Outward movement of the cap with respect to the casing is thus limited. The ring F, when in its expanded condition, closely fits the interior of the open end portion of the casing A, the front end portion of said ring being of greater external diameter than the rear portion thereof, to conform to the interior diameter of the casing, which is greater than the diameter of the opening defined by the flange 111. The rear edge face of the rib 26 of the ring F forms a shoulder 28 which seats against the shoulder formed by the rear wall of the groove 12, in which the rib 26 is seated. As will be evident, the amount the shoulder 27, at the inner end of the ring, is offset with respect to the shoulder 28, determines the extreme projected position of the cap F.

The ring shown in Figures 8 and 11, which is indicated by F', and the ring shown in Figures 9 and 12, which is indicated by F², correspond in all respects to the ring F hereinbefore described, with the exception that they are of different thicknesses. Each of the split rings F' and F² has an annular retaining rib corresponding to the rib 26 of the ring F and also indicated by 26. The rear edge face of the rib 26 of each ring F' and F² presents a shoulder identical with the shoulder 28 of the ring F and said shoulder is also indicated by 28. As shown in Figures 8 and 11, the inner end face of the ring F' is flush with the rear edge face of the rib 26 and presents an abutment shoulder 127 similar to the shoulder 27 of the ring F, with the exception that the shoulder 127 of the ring F' is spaced a distance from the shoulder 28 thereof which is less than the distance between the shoulders 27 and 28 of the ring F. In other words, the ring F' is of lesser thickness than the ring F. Assuming that the mechanism shown in Figure 1 containing the ring F represents a mechanism of the proper overall length, and due to unavoidable inaccuracies in dimensions of the parts of the mechanism, the overall length of any particular friction shock absorbing mechanism produced is under the required uniform overall length if the ring F were employed, which condition is illustrated in Figure 8 wherein the casing is shown of lesser length than the casing in Figure 1, the substitution of the ring F', which is of lesser thickness, compensates for these inaccuracies and provides a gear of the required overall length.

As shown in Figures 9 and 12, the inner end face of the ring $F^2$ is offset with respect to the rib 26 thereof, to a greater extent than the inner end face of the ring F, thus providing a shoulder 227 similar to the shoulder 27 of the ring F, which is spaced a distance from the shoulder 28 of the ring $F^2$, which is greater than the distance between the shoulders 27 and 28 of the ring F. In other words, the ring $F^2$ is of greater thickness than the ring F and its use compensates for unavoidable inaccuracies in dimensions of the parts of any particular friction shock absorbing mechanism which would result in the mechanism exceeding the required overall uniform length if the ring F were employed. This condition is illustrated in Figure 9 where the casing is shown as of greater length than the casing shown in Figure 1. Although three different thicknesses of rings are disclosed, it will be evident that the variation in thickness of the different rings may be more finely graduated and that the number of graduated rings may be suitably increased, if desired, to obtain still finer adjustment to compensate for the inaccuracies hereinbefore referred to.

Although Figures 8 and 9 show the casing A as respectively oversized and undersized length, it will be appreciated that these figures are only illustrative and that in the manufacture of friction shock absorbing mechanisms the friction casing is not alone subject to inaccuracies which must be compensated for, but that such inaccuracies may and do occur in other parts which make up the complete mechanism.

The inaccuracies may occur in the casing A, wedge, and spring cap, for example, the stop flange at the front end of the casing may be too thick or too thin or the wedge block may be slightly oversized or undersized, or the spring cap at the rear end of the casing may be slightly over or undersized, or the flange of the latter may be too thick or too thin.

The spring resistance D, as shown, comprises two coils, an inner light coil and a heavier outer coil, both coils having their front ends bearing on the inner ends of the shoes C—C—C. The two coils have their rear ends bearing respectively on the inner side of the end wall of the cap E and the flange 23 of said cap.

In assembling the mechanism, the wedge B, shoes C—C—C, and the two coils of the spring means D are inserted within the casing A through the open rear end thereof. During this operation, the front end of the casing is buttressed against a support with the wedge free, so that it remains in the projected position shown in Figure 1. The spring cap E is then applied, being pushed into the casing, against the resistance of the spring D, to such an extent as to entirely clear the groove 12 of the casing, that is, so that the outer end of the cap is displaced inwardly beyond the groove 12. With the parts thus positioned, any one of the combined retaining and spacing rings F, F' and $F^2$ may be readily inserted while in contracted condition, the opposed ends of each ring at the split section thereof being provided with seats or openings 29—29 adapted to receive the prongs of any suitable tool for contracting the ring and holding the same in contracted condition while being inserted within the casing. After the ring has been brought to position with the annular rib 26 thereof in alignment with the groove 12 of the casing, and the opening of the split section of the ring aligned with the rib 25 of the cap, the ring is permitted to expand and snap into position with the rib 26 seated in the groove 12. After the ring has been thus locked in position, the pressure is removed from the cap, permitting the spring means D to project the cap outwardly, thereby entering the rib 25 between the opposed end portions of the split section of the ring and forcing the flange 23 against the stop shoulder at the inner side of the ring. The cap is thus operatively connected to the casing and has its outward movement limited by the split ring.

The modified form of ring shown in Figures 6 and 7 is similar to the rings F, F' and $F^2$ hereinbefore described, with the exception that the ring shown in Figures 6 and 7 is of tapered form, that is, the end sections of the ring, which are opposed at the split thereof, are reduced in thickness, the interior of the ring being eccentric to its periphery. This permits the ring, when contracted, to assume a true circular contour, which facilitates assembly with the casing in that it need not be contracted to the same degree as the rings hereinbefore described, which are of uniform transverse thickness throughout.

In the production of my improved friction shock absorbing mechanism, all of the parts are made in the usual manner, the casing and spring cap being preferably made in the form of steel castings, and the wedge and shoes being steel forgings. A number of casings, shoes, wedges, springs, and spring caps are produced and a stock of graduated combined retaining and spacing rings are provided. The mechanism is then assembled as hereinbefore described, a ring of the thickness which has been found to maintain the average friction shock absorbing mechanism produced, of the proper overall length, being first selected and applied to the mechanism. The mechanism is then permitted to expand to its full extent and measured for overall length. In the event the overall length of the mechanism is found to be correct, its production has been completed. In case the measurement indicates that it exceeds the required overall length or that it is under the required length, the proper thickness of ring to compensate for the specific difference is selected and substituted for the ring which has been found to be of incorrect thickness.

The use of the split ring for retaining the cap assembled with the casing of the mechanism also greatly facilitates repair of the gear in that the spring cap may be readily detached from the casing and the mechanism dismantled, it being merely necessary to follow a procedure which is the reverse of the assembling procedure hereinbefore described. The spring cap is forced inwardly of the casing until it clears the combined retaining and spacing ring. The ring is then contracted to remove the same, thereby permitting removal of all the other parts.

As is well known to those skilled in this art, my improved shock absorbing mechanism is mounted on the railway car between the usual front and rear followers and is compressed between the same during both draft and buffing actions. In the operation of my improved mechanism, as the same is being compressed, the preliminary spring follower cap is forced inwardly against the spring resistance, the friction existing between the friction shoes and the casing being too great to permit inward movement of the clutch, which includes the wedge, until the spring cap E has been forced inwardly to the full extent of its movement and the cooperating follower of the draft rigging engages the rear end of the casing A. After the casing is engaged by the follower, the wedge is compelled to move inwardly, spreading the shoes apart and forcing the same along the friction surfaces of the friction shell section of the casing with resultant high frictional resistance. When the actuating pressure is reduced, the parts are all returned to the normal full release position shown in Figure 1 by the expansive action of the spring resistance, outward movement of the wedge B being limited by the stop flange 14 of the casing being engaged by the shoulders 19 of the wedge, and outward movement of the spring cap being limited by engagement of the flange 23 thereof with the combined retaining and spacing ring.

I claim:

In a friction shock absorbing mechanism, the combination with a casing having a friction shell section at one end and a spring cage section at the other end; of a friction clutch telescoped within the friction shell section; a preliminary spring cap slidingly telescoped within the spring cage end of the casing; a spring within the casing interposed between and opposing inward movement of the clutch and spring cap respectively; a contractible split spring ring, said ring in spread condition having shouldered engagement with the casing and cap to limit outward movement of the cap; and means on said cap engaging within the opening at the split portion of said ring to hold said ring in spread condition and lock the same and the cap against relative rotation.

ARNOLD E. DENTLER.

REFERENCES CITED

The following references are of record in the file of this patent:

UNITED STATES PATENTS

| Number | Name | Date |
| --- | --- | --- |
| 2,050,541 | Olander | Aug. 11, 1936 |
| 2,051,590 | Bratz | Aug. 18, 1936 |
| 2,076,769 | Dentler | Apr. 13, 1937 |
| 2,080,615 | Loewer | May 18, 1937 |
| 2,338,453 | Nelson | Jan. 4, 1944 |